United States Patent
Lim et al.

(10) Patent No.: US 9,024,737 B2
(45) Date of Patent: May 5, 2015

(54) ELECTRONIC DEVICE CASE FOR PROVIDING TACTILE FEEDBACK AND OPERATING METHOD THEREOF

(75) Inventors: Jeong Mook Lim, Daejeon (KR); Ki Uk Kyung, Daejeon (KR); Hee Sook Shin, Daejeon (KR); Jong Uk Lee, Gyeongsangbuk-do (KR); Jun Seok Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 94 days.

(21) Appl. No.: 13/540,679

(22) Filed: Jul. 3, 2012

(65) Prior Publication Data
US 2013/0088339 A1 Apr. 11, 2013

(30) Foreign Application Priority Data
Oct. 10, 2011 (KR) .................. 10-2011-0103251

(51) Int. Cl.
*H04B 3/36* (2006.01)
*H04M 19/04* (2006.01)

(52) U.S. Cl.
CPC .................. *H04M 19/047* (2013.01)

(58) Field of Classification Search
CPC .................. H04M 19/047; H04B 3/36
USPC .................. 340/407.1, 426.15, 426.2
See application file for complete search history.

(56) References Cited

U.S. PATENT DOCUMENTS

| | | | |
|---|---|---|---|
| 7,196,688 B2 * | 3/2007 | Schena | 345/156 |
| 2012/0126959 A1 * | 5/2012 | Zarrabi et al. | 340/407.1 |
| 2012/0154133 A1 * | 6/2012 | Kyung et al. | 340/407.1 |

FOREIGN PATENT DOCUMENTS

| | | |
|---|---|---|
| KR | 10-2009-0020037 | 2/2009 |
| KR | 10-2010-0036651 | 4/2010 |

* cited by examiner

*Primary Examiner* — Tai T Nguyen
(74) *Attorney, Agent, or Firm* — Staas & Halsey LLP

(57) ABSTRACT

Disclosed are an electronic device case for providing tactile feedback and an operation method thereof. The electronic device case for providing tactile feedback, includes: a communication interface unit receiving a control signal from an electronic device according to an operation of the electronic device; an actuator driver generating an electric signal corresponding to preset tactile pattern data according to the received control signal; and one or more film type actuators provided to contact the actuator driver and varying physical properties according to the control signal.

17 Claims, 10 Drawing Sheets

FIG. 8

Haptic Pattern Save
Reuest
(Pattern ID Array Type)

| MSG ID | Pattern ID | Reserved Field | | | Pattern Length | Pattern ID Array | | | |
|---|---|---|---|---|---|---|---|---|---|
| | | | | | | PIA[0] | PIA[1] | ... | PIA[n] |

Haptic Pattern Save
Reuest
(Byte Array Type)

| MSG ID | Pattern ID | Reserved Field | | | Pattern Length | Pattern Array | | | |
|---|---|---|---|---|---|---|---|---|---|
| | | | | | | PA[0] | PA[1] | ... | PA[n] |

Haptic Pattern Save
Reuest
(Pattern ID Type)

| MSG ID | Pattern ID | Result |
|---|---|---|

FIG. 9

Haptic Pattern Delete
Reuest

| MSG ID | Pattern ID |
|---|---|

Haptic Pattern Delete
Response

| MSG ID | Pattern ID | Result |
|---|---|---|

FIG. 10

Haptic Function Activate
Reuest

| MSG ID | Status |
|---|---|

Haptic Function Activate
Response

| MSG ID | Status |
|---|---|

FIG. 11

Haptic Pattern Play Request
(Pattern ID Type)

| MSG ID | Pattern ID | Play Option | | | |
|---|---|---|---|---|---|
| | | Repetition | Interval | Frequency | Play Type |
| | | | | | Overlapped-Play \| Sequential-Play |

Haptic Pattern Play Request
(Pattern ID Type)

| MSG ID | Pattern ID | Play Option | | | Pattern Length | Pattern Array | | | | Play Type |
|---|---|---|---|---|---|---|---|---|---|---|
| | | Repetition | Interval | Frequency | | PA[0] | PA[1] | ... | PA[n] | Overlapped-Play \| Sequential-Play |

Haptic Pattern Play
Response

| MSG ID | Pattern ID | Result |
|---|---|---|

Haptic Pattern Stop
Reuest

| MSG ID | Pattern ID |
|---|---|

Haptic Pattern Stop
Response

| MSG ID | Pattern ID | Result |
|---|---|---|

FIG. 12

Haptic Pattern Pause Reuest

| MSG ID | Pattern ID |
|---|---|

Haptic Pattern Pause Response

| MSG ID | Pattern ID | Result |
|---|---|---|

Haptic Pattern Resume Reuest

| MSG ID | Pattern ID |
|---|---|

Haptic Pattern Resume Response

| MSG ID | Pattern ID | Result |
|---|---|---|

FIG. 13
Haptic Controller Status
Reuest
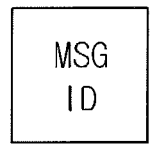
Haptic Controller Status
Response
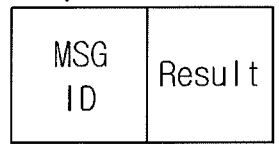

ELECTRONIC DEVICE CASE FOR PROVIDING TACTILE FEEDBACK AND OPERATING METHOD THEREOF

CROSS-REFERENCE TO RELATED APPLICATIONS

This application claims priority to and the benefit of Korean Patent Application No. 10-2011-0103251 filed in the Korean Intellectual Property Office on Oct. 10, 2011, the entire contents of which are incorporated herein by reference.

TECHNICAL FIELD

The present invention relates to an electric device case, and more particularly, to an electronic device case for providing tactile feedback that is detachably coupled to an electronic device and includes a film type actuator varying physical properties according to an electric signal to generate tactile output according to an operation of the electronic device, and an operation method thereof.

BACKGROUND ART

In recent years, touch input type electronic devices allowing a user to touch a surface of a screen for inputting information have been developed and produced in various forms. As a representative example of the touch input type electronic devices, a touch screen is a device that allows a user to touch a finger or a pen on a screen on which image information is displayed without using an input device such as a key board or a mouse.

Such electronic devices provide various interfaces to provide a user with a feedback. Among them, tactile feedback has widely been used.

The tactile feedback is a touch sensation felt by a finger tip of a man or a stylus pen when touching an object, and a sensation felt by a skin of body when reaching an object surface.

A device capable of playing dynamic characteristics (vibration, touch sense, operation sound, etc., transferred to a finger when a user pushes a button) as a response to when a man touches an actual object (actual button) by touching a virtual object (e.g., button display of a window screen) among devices using tactile feedback is the most ideal. To improve the performance of the tactile feedback device, a conventional mechatronic device or the like using a motor and a link mechanism has been used up to now.

However, a conventional mechatronic device has disadvantages that volume and energy consumption are large, and a small fault frequently occurs because of many components. Because a response speed of the conventional mechatronic device is low, tactile feedback may not be instantly provided. Due to this, the user can not be provided with a sufficiently actual feeling or has inconvenience of use.

SUMMARY OF THE PRESENT INVENTION

The present invention has been made in an effort to provide an electronic device case for providing tactile feedback that may be detachably coupled to an electronic device and include a film type actuator varying physical properties according to an electric signal to generate tactile output according to an operation of the electronic device, and an operation method thereof.

However, an object of the present invention is not limited to the above mentioned matters, and other non-mentioned objects will become apparent to those skilled in the art based on a following explanation.

An exemplary embodiment of the present invention provides an electronic device case for providing tactile feedback, the electric device case including: a communication interface unit receiving a control signal from an electronic device according to an operation of the electronic device; an actuator driver generating an electric signal corresponding to preset tactile pattern data according to the received control signal; and a film type actuator provided to contact the actuator driver and varying physical properties according to the control signal.

The film type actuator may be one of an electro-active polymer, an electro-active cellulose, or a shape memory alloy.

The film type actuator may be extended or reduced in left and right directions or upward and downward directions according to the electric signal.

The actuator driver may be provided to contact a partial region of the film type actuator.

The actuator driver may move in a first direction when the film type actuator is extended, and the second actuator driver may move in a second direction opposite to the first direction when the film type actuator is reduced.

The mass having a preset weight may be adhered to one end of the actuator driver.

A conductive material having elasticity may be adhered to a lower part of the film type actuator.

At least two of the film type actuators may be arranged at a predetermined interval and be equally driven.

The tactile pattern data may be generated by adjusting at least one of amplitude of an operation voltage, an output sampling rate per second, and an operation time.

The electronic device case may further includes: a pattern storage unit storing at least one tactile pattern data provided from the electronic device; a data transfer unit transferring the stored tactile pattern data; and a sampling timer counting the tactile pattern data for each byte for a preset output time.

The actuator driver may generate an electric signal corresponding to the tactile pattern data using the sampling timer.

Another exemplary embodiment provides a method of providing tactile feedback of an electronic device case engaging with an electronic device, the method including: receiving a control signal from the electronic device according to an operation of the electronic device; generating an electric signal corresponding to preset tactile pattern data according to the received control signal; and varying physical properties of one or a plurality of mounted film type actuators according to the electric signal.

The film type actuator may be one of an electro-active polymer, an electro-active cellulose, or a shape memory alloy.

The film type actuator may be extended or reduced in left and right directions or upward and downward directions according to the electric signal.

The plurality of film type actuators may be arranged at a predetermined interval and be equally driven.

The tactile pattern data may be generated by adjusting at least one of amplitude of an operation voltage, an output sampling rate per second, and an operation time.

The actuator driver may generate an electric signal corresponding to one tactile pattern data or at least two tactile pattern data to be output overlapping each other(?) or continuously.

According to this, the present invention may provide an electronic device case that is detachably coupled to an electronic device and include a film type actuator varying physical properties according to an electric signal to generate tactile output according to an operation of the electronic device which lead to being applicable to an electronic device without a haptic function therein.

The present invention may provide an electronic device case that is detachably coupled to an electronic device and include a film type actuator varying physical properties according to an electric signal to generate tactile output according to an operation of the electronic device, thereby implementing thin thickness of an electronic device case.

The present invention may continuously output tactile patterns in which the output sampling rate per second is differently designed in an outputable tactile effect, thereby easily expressing a Frequency Modulation effect in tactile output.

Similarly, the present invention may output differently designed tactile patterns to overlap each other to simultaneously reproduce at least one tactile effect (Harmonized Haptic Effect).

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 8 is an exemplary diagram illustrating a procedure of storing tactile pattern data according to an exemplary embodiment of the present invention.

FIG. 9 is an exemplary diagram illustrating a procedure of deleting tactile pattern data according to an exemplary embodiment of the present invention.

FIG. 10 is an exemplary diagram illustrating a data format for activating a haptic function according to an exemplary embodiment of the present invention.

FIG. 11 is an exemplary diagram illustrating a data format for playing/terminating a haptic pattern according to an exemplary embodiment of the present invention.

FIG. 12 is an exemplary diagram illustrating a data format for pausing/resuming a haptic pattern according to an exemplary embodiment of the present invention.

FIG. 13 is an exemplary diagram illustrating a data format for checking a state of a processor according to an exemplary embodiment of the present invention.

Figure 1:
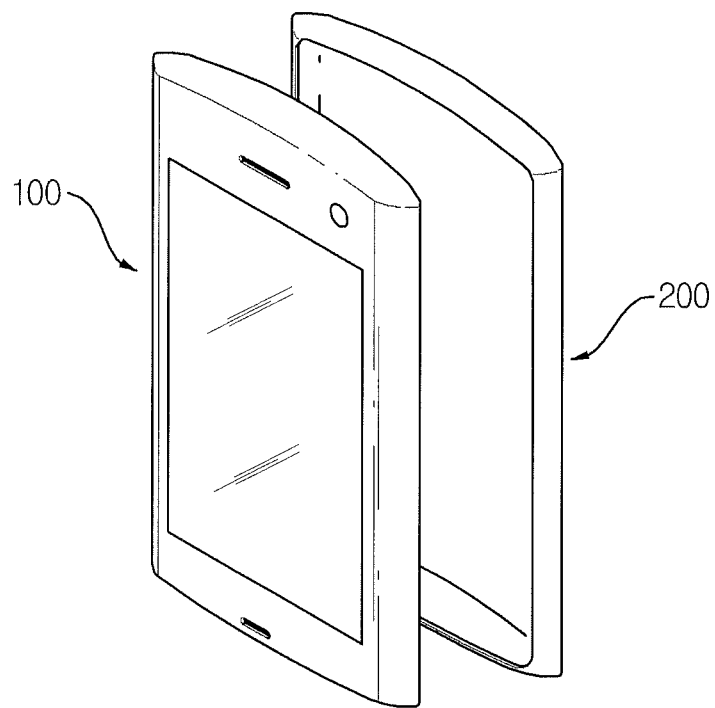
FIG. 1 is an exemplary diagram illustrating an electronic device case for providing tactile feedback according to an exemplary embodiment of the present invention.

It should be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an electronic device case for providing tactile feedback and an operating method thereof according to exemplary embodiments of the present invention will be described in detail with reference to the accompanying drawings, namely, FIGS. 1 to 13. Components essential to understand an operation and an action of the present invention will mainly be described in more detail. Throughout the specification, like reference numerals proposed in each drawing denotes like components.

The present invention suggests a new type of an electronic device case that may be detachably coupled to an electronic device and include a film type actuator varying physical properties according to an electric signal to generate tactile output according to an operation of the electronic device.

FIG. 1 is an exemplary view illustrating an electronic device case for providing tactile feedback according to an exemplary embodiment of the present invention.

As shown in FIG. 1, an electronic device case 200 for providing tactile feedback according to an exemplary embodiment of the present invention may be detachably coupled to an electronic device 100 functioning as an information terminal such as a portable phone, a smart phone, a tablet device, or the like to prevent physical damage due to collision and contact with an exterior. The electronic device case 200 may prevent the electronic device 100 from sliding from a hand.

The electronic device 100 operates various user interfaces through a device such as a touch screen. However, because it is determined based on visual information when the electronic device is operated using a touch screen, it is difficult to obtain an actual feeling such as a feeling of actually operating a button or a menu. Accordingly, the present invention suggests an electronic device case 200 generating tactile feedback.

That is, the electronic device case 200 according to the present invention may engage with the electronic device 100 and perform a haptic function providing tactile feedback to a user according to an operation of the electronic device 100. The electronic device case 200 will be described with reference to FIGS. 2 and 3.

Figure 2:
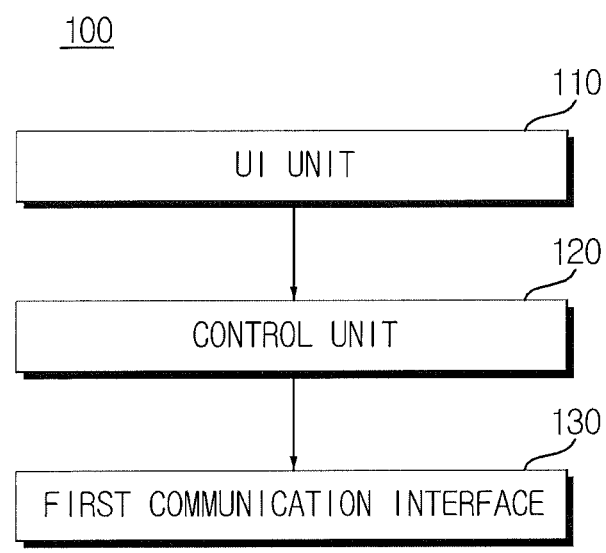
FIG. 2 is an exemplary diagram illustrating a detailed configuration of an electronic device shown in FIG. 1.

FIG. 2 is an exemplary diagram illustrating a detailed configuration of an electronic device 100 shown in FIG. 1.

As shown in FIG. 2, the electronic device 100 according to the present invention may include a User Interface (UI) unit 110, a control unit 120, and a first communication interface 130.

The UI unit 110 may include a key pad for inputting information and a display unit for displaying various applications as an interface for operating the electronic device. Particularly, the UI unit 110 may mean a touch key pad and a touch screen.

The control unit 120 may generate a control signal for controlling playback of preset haptic pattern data according to an operation through the UI 110 and output the generated control signal.

The first communication interface 130 may transmit and receive various control signals and data to and from the electronic device case, respectively. The first communication interface 130 may communicate with the electronic device case through wired communication or wireless communication. For example, when communicating with the electronic device case through the wired communication, the first communication interface 130 may be a connection terminal for electrically connecting to the electronic device case. When communicating with an electronic device case through wireless communication, the first communication interface 130 may be configured to be mounted as a wireless communication module.

Figure 3:
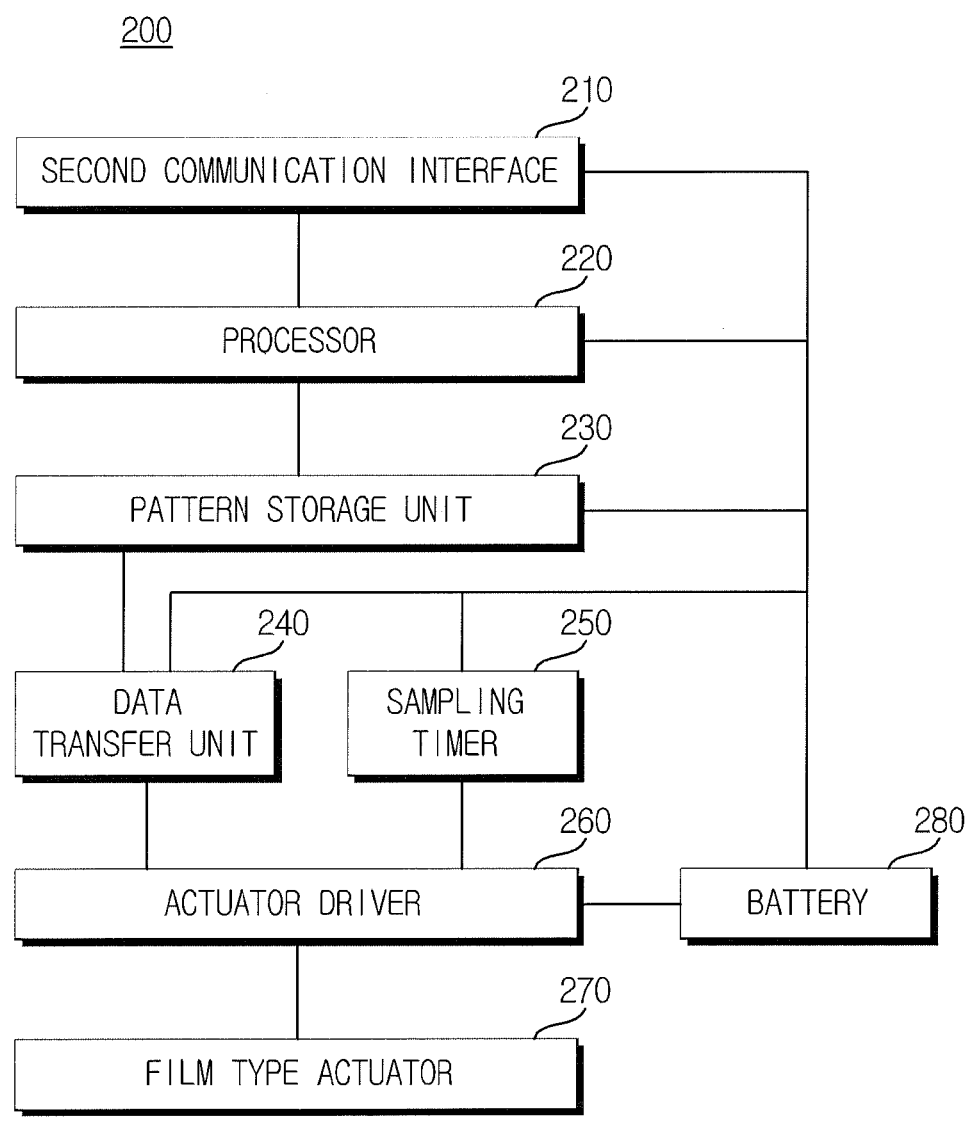
FIG. 3 is an exemplary diagram illustrating a detailed configuration of the electronic device case shown in FIG. 1.

FIG. 3 is an exemplary diagram illustrating a detailed configuration of the electronic device case 200 shown in FIG. 1.

Referring to FIG. 3, the electronic device case 200 may include a second communication interface 210, a processor 220, a pattern memory 230, a data transfer unit 240, a sampling timer 250, an actuator driver 260, a film type actuator 270, a battery 280, and the like.

The second communication interface 210 may transmit and receive various control signals and data to and from the electronic device case, respectively. The second communication interface 210 may communicate with the electronic device case through wired communication or wireless communication. For example, when communicating with the electronic device through the wired communication, the second communication interface 210 may be a connection terminal for electrically connecting to the electronic device case. The connection terminal may be configured in a projection form for connecting to a connection terminal of an electronic device. When communicating with an electronic device case through wireless communication, the second communication interface unit 210 may be configured to be mounted as a wireless communication module.

The processor 220 may process various control signals and data received from the electronic device. For example, when receiving a haptic pattern storage request message as a control signal, the processor 220 may store haptic pattern data included in the haptic pattern storage request message and generate haptic pattern storage response message in response thereto.

The pattern storage unit 230 may store and manage at least one tactile pattern data or haptic pattern data. The data transfer unit 240 may transfer at least one preset haptic pattern data of haptic pattern data stored in the pattern memory 230 according to an operation of the electronic device.

The sampling timer 250 may count an operation time of the haptic pattern data for each byte. The reason is for the purpose of controlling bytes output for a unit time.

The actuator driver 260 may generate an electric signal corresponding to haptic pattern data provided from the data transfer unit 240 and output the generated electric signal. That is, the actuator driver 260 generates the electric signal corresponding to the haptic pattern data using the sampling timer 250.

The film type actuator 270 may vary predetermined physical properties according to an electric signal output from the actuator driver 260 to provide physical stimulation, namely, tactile feedback to a user. Physical properties of the film type actuator 270 may vary, that is, the length thereof may be extended or reduced in left and right directions or upward and downward directions according to an electric signal. Electro-active polymers, electro-active celluloses, and shape memory alloys whose length is instantaneously extended or reduced within a limited range using an electric signal may be used as the film type actuator 270.

The battery 280 may supply power to all electronic devices in the case. According to this, the electronic device case may provide physical stimulation to the user by itself.

An operation principle of the electronic device case will be described with reference to FIGS. 4 to 6.

Figure 4:
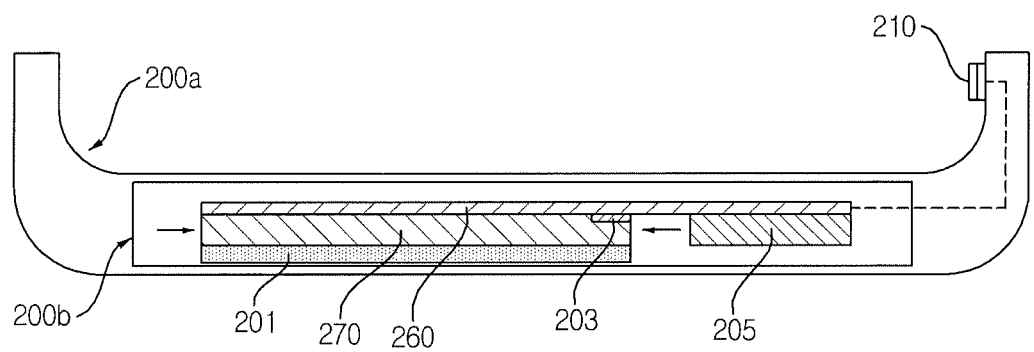
FIG. 4 is an exemplary view illustrating a section of an electronic device case according to an exemplary embodiment of the present invention.

FIG. 4 is an exemplary diagram illustrating a section of an electronic device case according to an exemplary embodiment of the present invention.

As shown in FIG. 4, the electronic device case according to the present invention may be formed to surround a part of the electronic device, and be mainly divided into a protection function unit 200a and a haptic function unit 200b. The protection function unit 200a functions to protect the electronic device from collision and contact with an exterior. It is preferable that a synthetic resin is used as a material of the protection function unit 200a.

The haptic function unit 200b may perform a function of providing physical stimulation, namely, tactile feedback to the user. The haptic function unit 200b may include a second communication interface 210, an elastic material 201, a film type actuator 270, an actuator driver 260, a contact surface 203, a mass 205, and the like.

The second interface 210 may transmit and receive various control signals and data to and from the electronic device case, respectively. The elastic material 201 may be located in the lowermost part in the haptic function unit 200b. For example, a material such as rubber or a conductive material having elasticity may be used as the elastic material 201. It is preferable that a conductive material having elasticity, namely, a conductive elastic material for operative association with the film type actuator is used as the elastic material 201.

The film type actuator 270 is adhered to an upper part of the elastic material 201. When applying an electric signal to the film type actuator 270, the length thereof may be extended or reduced.

Figure 5A:
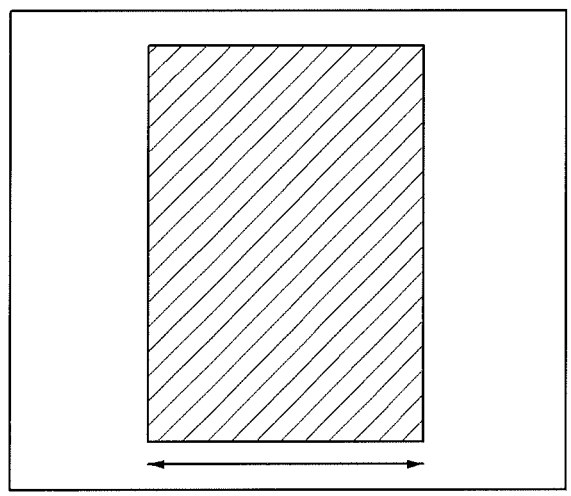
FIGS. 5A and 5B are an exemplary view illustrating an example of an arranged form of a film type actuator according to an exemplary embodiment of the present invention.
Figure 5B:
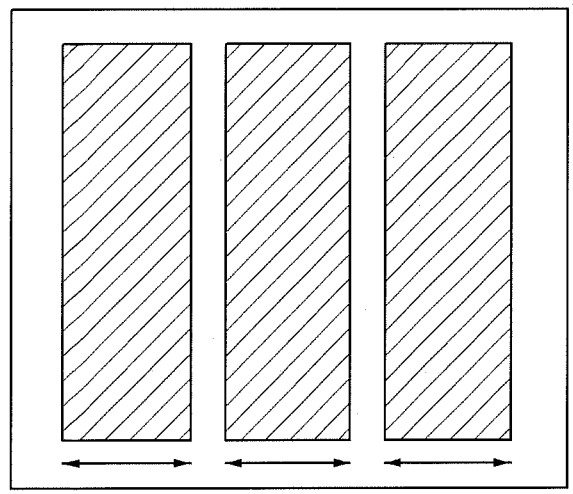

FIGS. 5A and 5B are an exemplary view illustrating an example of an arranged form of a film type actuator 270 according to an exemplary embodiment of the present invention.

One film type actuator 270 may be used as shown in FIG. 5A, or at least two film type actuators 270 may be arranged parallel with each other as shown in FIG. 5B.

In particular, if an electric signal is applied to at least two film type actuators 270 arranged parallel with each other as shown in FIG. 5B, the lengths thereof may be simultaneously extended or reduced, which leads to increase in a degree of physical stimulation.

At least two film type actuators arranged parallel with each other may be used. However, the present invention is not limited thereto. That is, the film type actuators arranged in various forms may be used.

The actuator driver 260 is adhered to an upper part of the film type actuator 270, and has the contact surface contacting a partial region of the film type actuator 270. The actuator driver 260 may output an electric signal corresponding to haptic pattern data.

Figure 6A:
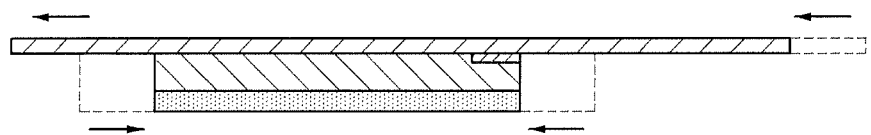
FIGS. 6A and 6B are an exemplary view illustrating an operation principle of an actuator driver according to an exemplary embodiment of the present invention.
Figure 6B:
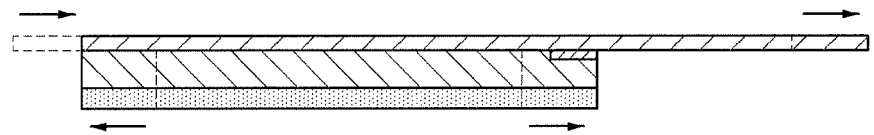

FIGS. 6A and 6B are an exemplary view illustrating an operation principle of an actuator driver 260 according to an exemplary embodiment of the present invention.

As shown in FIGS. 6A and 6B, because the actuator driver 260 contacts a partial region of the film type actuator 270, it is moved according to variation in physical properties of the film type actuator 270.

As shown in FIG. 6A, when the film type actuator 270 is reduced, the actuator driver 260 is moved in a left direction.

As shown in FIG. 6B, when the film type actuator 270 is extended, the actuator driver 260 is moved in a right direction.

In this case, the actuator driver 260 and the film type actuator 270 may contact each other by an adhesive or the like.

The mass 205 is adhered to one end of the actuator driver 260. This is for the purpose of generating inertial variation to strongly transfer tactile feedback to a user grasping a case.

The mass 205 may be substituted by a battery supplying power to a case.

When the mass 205 is not separately adhered, the present invention may increase a weight of the actuator driver 260 to greatly generate tactile feedback.

Figure 7:
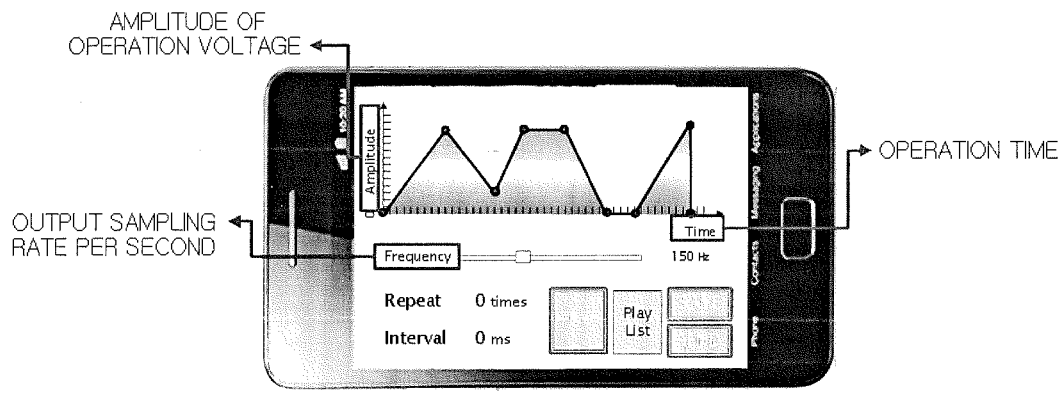
FIG. 7 is an exemplary view illustrating a principle for generating tactile pattern data according to an exemplary embodiment of the present invention.

FIG. 7 is an exemplary view illustrating a principle for generating tactile pattern data according to an exemplary embodiment of the present invention.

As shown in FIG. 7, tactile pattern data according to an embodiment of the present invention may be generated by adjusting amplitude of an operation voltage, an output sampling rate or vibration frequency per second of an actuator, and an operation time.

The number of iterations and a time interval between repeated output tactile pattern data may be set with respect to the generated tactile pattern data to generate another tactile pattern data.

For example, the amplitude of the operation voltage may be set having 256 levels. The output sampling rate or vibration frequency per second of an actuator may be set to 1-8000.

In this case, the iteration number and a time interval between output tactile pattern data may be separately set.

As illustrated previously, because a vibration frequency of tactile pattern data as well as a vibration time and amplitude of the tactile pattern data may be freely changed, various tactile pattern data may be generated.

The present invention may generate tactile pattern data by simple data conversion with respect to an output sound in an electronic device. That is, because the present invention may generate tactile pattern data by overlapping vibration of various frequencies, a feeling of playing instruments outputting sounds with different frequencies at the same time may be provided through a tactile feedback.

Prior to the present invention, methods of generating tactile pattern data by simple data conversion with respect to an output sound in an electronic device have been suggested.

However, the existing methods do not reflect various characteristics of an input sound, and convert data filtered into partial characteristics, namely, a volume or a specific frequency band of a sound into vibration of a predetermined frequency and outputs the converted data, thereby enabling tactile output of a form in which characteristics of an input sound are restricted.

However, the present invention may filter a certain frequency band of at least one input sound to overlap or output with vibration using at least one frequency or convert input sound data into tactile patterns generated with different sampling rates per second and continuously output the converted tactile patterns to minimize loss of characteristics in an input sound, thereby achieving tactile output.

Hereinafter, various message formats used for a haptic function according to an embodiment of the present invention will be described with reference to FIGS. 8 to 13.

FIG. 8 is an exemplary diagram illustrating a message format of storing tactile pattern data according to an exemplary embodiment of the present invention.

As shown in FIG. 8, an electronic device according to an embodiment of the present may transmit a haptic pattern save request message for requesting save of haptic pattern data to the electronic device case.

In this case, the haptic pattern save request message may contain an MSG ID field indicating a message ID, a PATTERN ID field indicating a haptic pattern ID, a RESERVED field to used be next, a PATTERN LENGTH field indicating the length of a haptic pattern, and a PATTERN ID ARRAY field listing IDs of the haptic pattern.

Meanwhile, the electronic device case may transmit a haptic pattern save response message to the electronic device as a response to a haptic pattern save request message.

In this case, the haptic pattern save response message may contain a MSG ID field, a PATTERN ID field, and a RESULT indicating a save result of the haptic pattern.

FIG. 9 is an exemplary diagram illustrating a message format of deleting tactile pattern data according to an exemplary embodiment of the present invention.

As shown in FIG. 9, the electronic device according to an embodiment of the present invention may transmit a haptic pattern delete request message for requesting deletion of haptic pattern data to the electronic device case.

In this case, the haptic pattern delete request message may contain an MSG ID field and a PATTERN ID.

In the meantime, the electronic device case may transmit a haptic pattern delete response message to the electronic device as a response to the haptic pattern delete request message.

In this case, the haptic pattern delete response message may contain an MSG ID field, a PATTERN ID field, and a RESULT field indicating a save result of a haptic pattern.

FIG. 10 is an exemplary diagram illustrating a message data for activating a haptic function according to an exemplary embodiment of the present invention.

As shown in FIG. 10, an electronic device according to an embodiment of the present invention may transmit a haptic function activate request message for activating a haptic function of the electronic device case to the electronic device case.

In this case, the haptic function activate request message may contain an MSG ID field, and a STATUS field indicating presence of activation of the haptic function.

In the meantime, the electronic device case may transmit a haptic function activate response message to the electronic device as a response to the haptic function activate request message.

In this case, the haptic function activate response message may contain an MSG ID field and a STATUS field.

FIG. 11 is an exemplary diagram illustrating a message format for playing/terminating a haptic pattern according to an exemplary embodiment of the present invention.

As shown in FIG. 11, the electronic device according to an embodiment of the present invention may transmit a haptic pattern play request message for playing the haptic pattern to the electronic device case.

In this case, the haptic pattern play request message may contain an MSG ID field, a PATTERN ID field, a PLAY OPTION indicating an option for playing a haptic pattern, and the like. Here, the PLAY OPTION may contain a REPETITION field indicating the iteration output number of haptic patterns, an INTERVAL field indicating a time interval between the haptic patterns when the haptic patterns are repeatedly output, a FREQUENCY field indicating an output sampling rate per second of the haptic patterns, and a PLAY TYPE field indicating an operation mode. Here, the PLAY TYPE field may set an OVERLAPPED_PLAY mode indicating whether current output is generated to overlap previous output, a SEQUENTIAL_PLAY mode indicating whether the current output is generated after termination of the previous output, and the like.

The haptic pattern play request message may contain an MSG ID field, a PATTERN ID field, a PLAY OPTION field, a PATTERN LENGTH field, a PATTERN ARRAY field, a PLAY TYPE field, and the like.

The haptic pattern play request message may contain an MSG ID field, a PATTERN ID field, a PLAY OPTION field, a BYTE LENGTH field, a BYTE ARRAY field, and the like.

In the meantime, the electronic device case may transmit a haptic pattern play response message to the electronic device as a response to the haptic pattern play request message.

In this case, the haptic pattern play response message may contain an MSG ID field, a PATTERN ID field, and a RESULT field indicating whether the haptic patterns are played.

The electronic device according to an embodiment of the present invention may transmit a haptic pattern stop request message for stopping playback of haptic patterns to the electronic device case.

In this case, the haptic pattern stop request message may contain an MSG ID field, a PATTERN ID field, and the like.

In the meantime, the electronic device case may transmit a haptic pattern stop response message to the electronic device as a response to the haptic pattern stop request message.

In this case, the haptic pattern stop response message may contain an MSG ID field, a PATTERN ID field, and a RESULT filed indicating whether the haptic patterns are stopped.

FIG. 12 is an exemplary diagram illustrating a message format for pausing/resuming a haptic pattern according to an exemplary embodiment of the present invention.

As shown in FIG. 12, the electronic device according to the invention may transmit a haptic pattern pause request message for pausing playback of the haptic patterns to the electronic device case.

In this case, the haptic pattern pause request message may contain an MSG ID field, a PATTERN ID field, and the like.

In the meantime, the electronic device case may transmit a haptic pattern pause response message to the electronic device as a response to the haptic pattern pause response message.

In this case, the haptic pattern pause response message may contain an MSG ID field, a PATTERN ID field, and a RESULT field indicating whether the haptic patterns are paused.

The electronic device according to an embodiment invention may transmit a haptic pattern resume request message for resuming haptic patterns to the electronic device case.

In this case, the haptic pattern resume request message may contain an MSG ID field, a PATTERN ID, and the like.

In the meantime, the electronic device case may transmit a haptic pattern resume response message to the electronic device as a response to the haptic pattern resume request message.

In this case, the haptic pattern resume response message may contain an MSG ID field, a PATTERN ID field, a RESULT field indicating whether a haptic pattern is resumed, and the like.

FIG. 13 is an exemplary diagram illustrating a message format for checking a state of a processor according to an exemplary embodiment of the present invention.

As shown in FIG. 13, the electronic device according to an embodiment may transmit a haptic controller status request message for requesting a state of a processor in the electronic device case to the electronic device case.

In this case, the haptic controller status request message may include an MSD ID field and the like.

Meanwhile, the electronic device case may transmit a haptic controller status response message to the electronic device as a response to the haptic controller status request message.

In this case, the haptic controller status response message may contain an MSD field and a STATUS field indicating state information of the processor.

As described above, the electronic device case for providing tactile feedback and an operating method thereof according to the exemplary embodiments have been described and illustrated in the drawings and the specification. The exemplary embodiments were chosen and described in order to explain certain principles of the present invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the present invention are deemed to be covered by the present invention which is limited only by the claims which follow.

What is claimed is:

1. An electronic device case for providing tactile feedback, the electric device case comprising:
   a communication interface unit receiving a control signal from an electronic device according to an operation of the electronic device;
   an actuator driver generating an electric signal corresponding to preset tactile pattern data according to the received control signal; and
   one or more film type actuators provided to contact the actuator driver and varying physical properties according to the control signal.

2. The electronic device case of claim 1, wherein the film type actuator is one of an electro-active polymer, an electro-active cellulose, or a shape memory alloy.

3. The electronic device case of claim 1, wherein the film type actuator is extended or reduced in left and right directions or upward and downward directions according to the electric signal.

4. The electronic device case of claim 1, wherein the actuator driver is provided to contact a partial region of the film type actuator.

5. The electronic device case of claim 4, wherein the actuator driver moves in a first direction when the film type actuator is extended, and the actuator driver moves in a second direction opposite to the first direction when the film type actuator is reduced.

6. The electronic device case of claim 1, wherein a mass having a preset weight is adhered to one end of the actuator driver.

7. The electronic device case of claim 1, wherein a conductive material having elasticity is adhered to a lower part of the film type actuator.

8. The electronic device case of claim 1, wherein at least two of the film type actuators are arranged at a predetermined interval and are equally driven.

9. The electronic device case of claim 1, wherein the tactile pattern data are generated by adjusting at least one of amplitude of an operation voltage, an output sampling rate per second, and an operation time.

10. The electronic device case of claim 1, further comprising:
a pattern storage unit storing at least one tactile pattern data provided from the electronic device;
a data transfer unit transferring the stored tactile pattern data; and
a sampling timer counting the tactile pattern data for each byte for a preset output time.

11. The electronic device case of claim 10, wherein the actuator driver generates an electric signal corresponding to the tactile pattern data using the sampling timer.

12. The electronic device case of claim 10, wherein the actuator driver generates an electric signal corresponding to one tactile pattern data or at least two tactile pattern data to be output overlapping each other or continuously.

13. A method of providing tactile feedback of an electronic device case engaging with an electronic device, the method comprising:
receiving a control signal from the electronic device according to an operation of the electronic device;
generating an electric signal corresponding to preset tactile pattern data according to the received control signal; and
varying physical properties of a mounted film type actuator according to the electric signal.

14. The method of claim 13, wherein the film type actuator is one of an electro-active polymer, an electro-active cellulose, or a shape memory alloy.

15. The method of claim 13, wherein the film type actuator is extended or reduced in left and right directions or upward and downward directions according to the electric signal.

16. The method of claim 13, wherein a plurality of film type actuators are arranged at a predetermined interval and are equally driven.

17. The method of claim 13, wherein the tactile pattern data are generated by adjusting at least one of an amplitude of an operation voltage, an output sampling rate per second, and an operation time.

* * * * *